United States Patent
Uphues

(10) Patent No.: US 7,357,462 B2
(45) Date of Patent: Apr. 15, 2008

(54) HYDRAULIC BRAKE SYSTEM FOR A WIND ENERGY PLANT

(75) Inventor: Ulrich Uphues, Hannover (DE)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 10/508,576

(22) PCT Filed: Mar. 24, 2003

(86) PCT No.: PCT/EP03/03046

§ 371 (c)(1),
(2), (4) Date: Aug. 15, 2005

(87) PCT Pub. No.: WO03/080413

PCT Pub. Date: Oct. 2, 2003

(65) Prior Publication Data

US 2005/0279593 A1 Dec. 22, 2005

(30) Foreign Application Priority Data

Mar. 23, 2002 (DE) .................................. 102 13 096

(51) Int. Cl.
*B60T 13/66* (2006.01)
(52) U.S. Cl. ............................................. 303/2; 303/3
(58) Field of Classification Search ................ 188/170, 188/166, 72.3; 303/3
See application file for complete search history.

(56) References Cited

U.S. PATENT DOCUMENTS

| 3,528,707 | A | * | 9/1970 | Casey | 303/10 |
| 3,802,746 | A | * | 4/1974 | Waiser | 303/10 |
| 3,985,210 | A | * | 10/1976 | Hodge et al. | 188/170 |
| 4,037,878 | A | * | 7/1977 | Zyduck | 303/13 |
| 4,181,368 | A | * | 1/1980 | Strom | 303/15 |
| 4,339,154 | A | * | 7/1982 | Duttarer et al. | 303/3 |
| 4,458,791 | A | * | 7/1984 | Schneider et al. | 188/170 |
| 5,203,616 | A | * | 4/1993 | Johnson | 303/10 |
| 5,285,027 | A | * | 2/1994 | Nakamura et al. | 187/275 |
| 5,601,160 | A | * | 2/1997 | Horsch | 188/71.5 |
| 5,611,199 | A | * | 3/1997 | Bray | 60/404 |
| 5,648,644 | A | * | 7/1997 | Nagel | 187/288 |
| 5,779,325 | A | * | 7/1998 | Diesel | 303/72 |
| 5,904,228 | A | * | 5/1999 | Eike et al. | 188/170 |

(Continued)

*Primary Examiner*—Christopher P. Schwartz
(74) *Attorney, Agent, or Firm*—Blakely, Sokoloff, Taylor & Zafman LLP

(57) ABSTRACT

The hydraulic brake system comprises a piston/cylinder unit (14) for activating and releasing a brake (12), comprising a volume (16) adapted to have a pressurized working fluid supplied thereto for moving the piston (24) from a braking position into a release position for releasing the brake. Further, the hydraulic brake system comprises a supply line (18) for the supply of working fluid from a reservoir (22), a discharge line (30) for the discharge of working fluid from the volume (16) of the piston/ cyliinder unit (14), a first valve (34) and an element (36) for determining the flow resistance, a bypass line (32) provided with a second ON/OFF valve (38) and arranged for a flow in parallel to the discharge line (30). At the start of a braking process, among the two ON/OFF valves (34,38) which in the released condition of the brake are in the closed condition, the first ON/OFF valve (34) is opened and, upon lapse of a presettable first time period ($T_{delay1}$) from the opening of the first ON/OFF valve (34), the second ON/OFF valve (38) is opened.

7 Claims, 2 Drawing Sheets

U.S. PATENT DOCUMENTS 5,984,425 A * 11/1999 Orzal .............................. 303/3
6,105,738 A * 8/2000 Christen ..................... 188/170
6,254,197 B1 * 7/2001 Lading et al. ................. 303/2
6,312,060 B1 * 11/2001 Lipscomb et al. ............. 303/9
6,428,117 B1 * 8/2002 Messersmith .................. 303/3
6,688,419 B2 * 2/2004 Eriksen et al. ............. 180/308

* cited by examiner

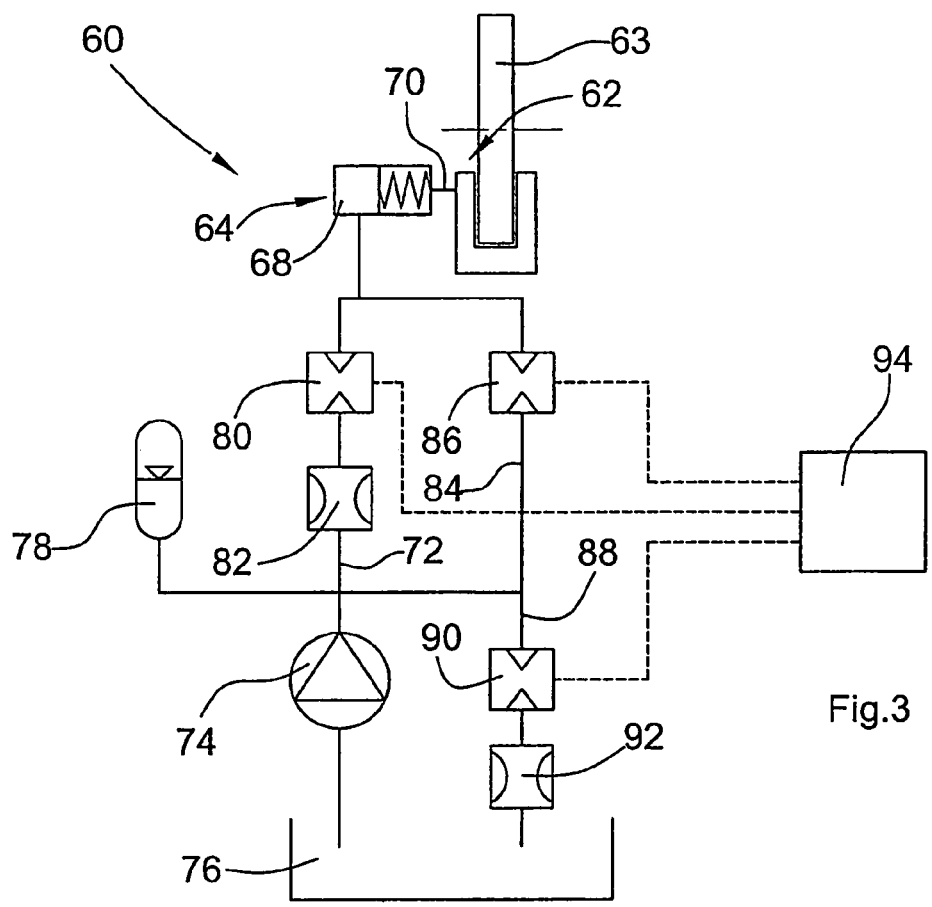
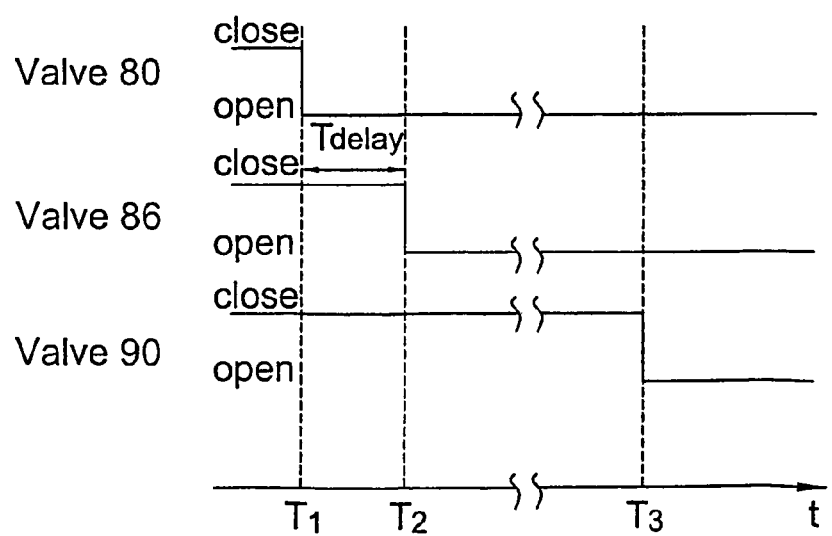
Fig.3
Fig.4

HYDRAULIC BRAKE SYSTEM FOR A WIND ENERGY PLANT

CROSS-REFERENCE TO OTHER APPLICATIONS

This application is a National Phase Application of International Application No. PCT/EP03/03046, filed Mar. 24, 2003, which claims priority from German Patent Application No. 102 13 096.5, filed Mar. 23, 2002.

FIELD OF THE INVENTION

The invention relates to a hydraulic brake system for braking a moving component of a wind energy plant, such as the brake disk of the power train or the azimuth drive of the wind energy plant.

BACKGROUND OF THE INVENTION

In several technical applications hydraulic brake systems are used, wherein, in particular in cases of emergency, a rotating component must for reasons of safety be braked down to a standstill within a very short period of time. An example of such a technical application is a wind energy plant whose rotor must be very rapidly braked in the case of malfunctions.

In order to meet the requirements of rapid braking, a relatively large braking force should be applied, which may however lead to considerable vibrations and excessive dynamic load peaks in the system to be braked. This, in turn, may cause damage to the system and lead to relatively large material fatigue and aging.

From WO-A-98/23474 a hydraulic brake system for, inter alia, wind energy plants is known, which ensures smooth braking of the rotor via a relatively complex valve drive.

SUMMARY OF THE INVENTION

It is an object of the present invention to provide a hydraulic brake system for braking a rotating component, the brake system, which is of a very simple configuration, allowing for relatively low-vibration and in any case reliable braking of the component.

To achieve this object the invention suggests, according to a first aspect, a hydraulic brake system comprising:
- at least one piston/cylinder unit for activating and releasing a brake,
- the piston being biased into a braking position for activating the brake and the cylinder comprising a volume adapted to have a pressurized working fluid supplied thereto for moving the piston from the braking position into a release position for releasing the brake,
- a supply line connected to the volume of the at least one piston/cylinder unit for the supply of working fluid from a reservoir,
- a pump arranged in the supply line,
- a discharge line for the discharge of working fluid from the volume of the at least one piston/cylinder unit,
- a first ON/OFF valve and an element arranged in the discharge line for determining the flow resistance,
- a bypass line provided with a second ON/OFF valve and arranged for a flow in parallel to the discharge line,
- a drive unit for the two ON/OFF valves,
- wherein, at the start of a braking process, the drive unit, among the two ON/OFF valves which in the released condition of the brake are in the closed condition, opens the first ON/OFF valve and, upon lapse of a presettable first time period from the opening of the first ON/OFF valve, opens the second ON/OFF valve.

Alternatively, the brake system comprises:
- at least one piston/cylinder unit for activating and releasing a brake,
- the piston being biased into a braking position for activating the brake and the cylinder comprising a volume adapted to have a pressurized working fluid supplied thereto for moving the piston from the braking position into a release position for releasing the brake,
- a supply line connected to the volume of the at least one piston/cylinder unit for the supply of working fluid from a reservoir,
- a pump arranged in the supply line,
- a discharge line for the discharge of working fluid from the volume of the at least one piston/cylinder unit,
- a first ON/OFF valve and an element arranged In the discharge line for determining the flow resistance,
- a bypass line provided with a second ON/OFF valve and arranged for a flow in parallel to the discharge line,
- a further ON/OFF valve for the selective interruption or maintenance of a fluid connection between the pump and the volume of the at least one piston/cylinder unit, and
- a drive unit for the ON/OFF valves,
- wherein, at the start of a braking process, the drive unit closes the further ON/OFF valve and among the two ON/OFF valves in the discharge line and the bypass line, which in the released condition of the brake are in the closed condition, opens the first ON/OFF valve and, upon lapse of a presettable first time period ($T_{delay1}$) from the opening of the first ON/OFF, opens the second ON/OFF valve.

This first embodiment of the two aforementioned embodiments comprises a passive brake which automatically acts upon the component to be braked when the working fluid pressure decreases. For this purpose, the piston of the at least one piston/cylinder unit is e.g. mechanically biased by a spring into a release position. The volume of the piston/cylinder unit is normally supplied with, pressurized working fluid which is fed by a pump via a supply line and kept under pressure thus maintaining the brake in the open position against the spring bias.

To prevent the brake from automatically falling into the operative position in the case of pump failure, a storage means is connected via a line with the volume of the piston/cylinder unit, said storage means being supplied by the pump with pressurized working fluid. In the case of pump failure, the pressure of the working fluid in the volume of the piston/cylinder unit is maintained via the storage means. This aspect is essential for reasons of safety, it is however of minor importance to the invention.

To allow activation of the passive brake in a case of emergency, working fluid can escape via a discharge line from the volume of the piston/cylinder unit. To prevent this process from occurring all too suddenly, the discharge line is, according to the invention, on the one hand adapted to be opened and closed, for which purpose an ON/OFF valve is arranged in the discharge line. On the other hand, the flow resistance of the working fluid in the discharge line is increased by arranging an element in the discharge line or by the configuration of the valve, such that the working fluid cannot all too suddenly flow out of the volume of the piston/cylinder unit. The element determining the flow resistance is in particular a constriction, i.e. a reduction of the cross-section.

Concerning the operating safety, it is necessary that enough working fluid can be discharged via the discharge line per unit of time to allow this brake to fall into the operative position in due time and to a large enough extent. To ensure this even in the case of e.g. an unintended reduction of the flow cross-section due to deposits in the valve and/or the element and/or the line, the invention provides a further valve which is arranged in a bypass line connected in parallel to the discharge line, and is closed at the start of a braking process, said valve being opened in a time-controlled manner after opening of the valve in the discharge line. The time period is presettable. According to the invention, this forced opening of the second valve ensures that actually as much working fluid as is required for final activation of the brake can escape from the volume of the piston/cylinder unit, irrespective of whether working fluid has already escaped from the volume of the piston/cylinder unit, or of the amount of escaped working fluid. In the case of correct operation of the element determining the flow resistance in the discharge line, the entire amount of working fluid required for correct activation of the brake has, upon lapse of the time period between opening of the ON/OFF valve in the discharge line and opening of the ON/OFF valve in the bypass line, already flown out of the volume of the at least one piston/cylinder unit via the discharge line; the ON/OFF valve in the bypass line thus performs a safety function.

Due to the concept of "smooth falling into the operative position" of the brake provided by the invention, vibrations and excessive dynamic load peaks acting upon the system to be braked are reduced, whereby the components of this system are protected against damage and material fatigue is reduced.

Vibrations and excessive dynamic load peaks do however not only occur at the start of a braking process but also at the end of said process (so-called stoppage vibrations). Thus, according to a further aspect of the invention, the brake is released before the component to be braked comes to a final standstill. For this purpose, the brake system additionally comprises:

a further supply line connected to the volume of the at least one piston/cylinder unit, a storage means for pressurized working fluid, connected to the further supply line, and a further ON/OFF valve arranged in the further supply line, the drive unit at the start of a braking process closing the further ON/OFF valve which in the released condition of the brake is in the opened position, and at the end of a braking process, the drive unit closes the first and second ON/OFF valves and opens the further ON/OFF valve for supplying pressurized working fluid from the storage means to the volume of the at least one piston/cylinder unit.

The storage means provided in this aspect of the invention differs from the storage means described above and can in particular be realized by the pump and the reservoir. The further supply line from the storage means to the volume of the piston/cylinder unit is normally open.

At the start of a braking process the (further) ON/OFF valve is closed and the other valves are driven as described above via the drive unit. When the presettable minimum rotational number or minimum speed of the component to be braked is reached, the valves in the discharge and the bypass line are closed and the further valve is opened such that working fluid flows from the storage means into the volume of the piston/cylinder unit and releases again the passive brake. This counteracts the generation of stoppage vibrations.

To prevent the (re-) filling of the volume of the piston/cylinder unit from occurring all too suddenly, it is appropriate to arrange an element In the discharge line for increasing the flow resistance, which is realizable by a corresponding configuration of the further valve, the further supply line, or arrangement of a component, e.g. a constriction.

Preferably, the brake is activated again after its release, which is appropriately performed in the same manner as at the start of a braking process. Thus the drive unit closes the further valve and opens the valve in the discharge line. Preferably, this process is followed by a time-controlled opening of the valve in the bypass line.

Instead of a passive brake, the brake system according to the invention may comprise an active brake whose at least one piston/cylinder unit must be supplied with pressurized working fluid for activation purposes. This embodiment of the invention is provided with:

at least one piston/cylinder unit for activation and release of a brake, the cylinder comprising a volume provided to have a pressurized working fluid supplied thereto, a supply line connected to the volume of the at least one piston/cylinder unit for the supply of pressurized working fluid from a reservoir or a storage means, a pump arranged in the supply line, a first ON/OFF valve and an element for determining the flow resistance, both of them arranged in the supply line between the pump and the volume of the at least on piston/cylinder unit, a bypass line provided with a second ON/OFF valve and arranged in parallel to the first ON/OFF valve and the element for determining the flow resistance, and a drive unit for the two ON/OFF valves, wherein, at the start of a braking process, the drive unit, among the two ON/OFF valves which in the released condition of the brake are In the closed condition, opens the first ON/OFF valve and, upon lapse of a presettable first time period from the opening of the first ON/OFF valve, opens the second ON/OFF valve.

In this embodiment, an ON/OFF valve and an element determining the flow resistance are provided in the supply line connecting the pump with the volume of the piston/cylinder unit. A bypass line provided with an ON/OFF valve is arranged in parallel to this portion of the supply line. At the start of the braking process, first the valve in the supply line opens such that, as determined by the flow resistance, working fluid flows into the volume of the piston/cylinder unit at a specified rate for "smooth" actuation of the active brake. In a time-controlled manner the valve in the bypass line opens upon lapse of a presettable time period. Thus a reliable falling into the operative position of the active brake is guaranteed.

For reasons of operating safety, the pump pumps working fluid into a storage means branching off the supply line behind the pump and in front of the valve or the element determining the flow resistance. In the case of pump failure, the storage means contains a sufficient amount of working fluid for filling all piston/cylinder units of the brake. This aspect of a hydraulic brake system comprising an active brake is of minor importance to the invention.

The embodiment of the invention described above helps to counteract vibrations and excessive dynamic load peaks generated in the system to be braked at the start of a braking process. This embodiment can be extended by a (additional) (discharge) line provided with a valve in order to reduce stoppage vibrations occurring at the end of a braking process. For this purpose this aspect of the embodiment of the invention comprises:

a discharge line provided with a further ON/OFF valve and arranged in flow connection with the volume of the at least one piston/cylinder unit;

wherein the further ON/OFF valve, being closed in the released condition of the brake, is maintained in the closed condition at the start of a braking process, and wherein, at the end of a braking process, the drive unit, if the speed of the component to be braked has decreased to a presettable value, opens the further ON/OFF valve for releasing pressurized working fluid from the volume of the at least one piston/cylinder unit.

Via the discharge line branching off e.g. the bypass line or the supply line working fluid can be discharged from the piston/cylinder unit by opening the further valve. This process releases the brake. For subsequent activation of the brake for the purpose of fixing the component to be braked when said component has stopped, the further valve is closed again such that working fluid can no longer flow out of the volume of the piston/cylinder unit, and thus this volume is refilled with working fluid from the storage means.

BRIEF DESCRIPTION OF THE DRAWINGS

Hereunder the invention is explained in detail with reference to the drawings in which:

FIG. 3 shows the circuit diagram for a hydraulic brake system comprising an active brake, and FIG. 4 shows a schematic representation of the time sequence for driving the valves of the system shown in FIG. 3.

DETAILED DESCRIPTION OF PREFERRED EMBODIMENTS

Figure 1:
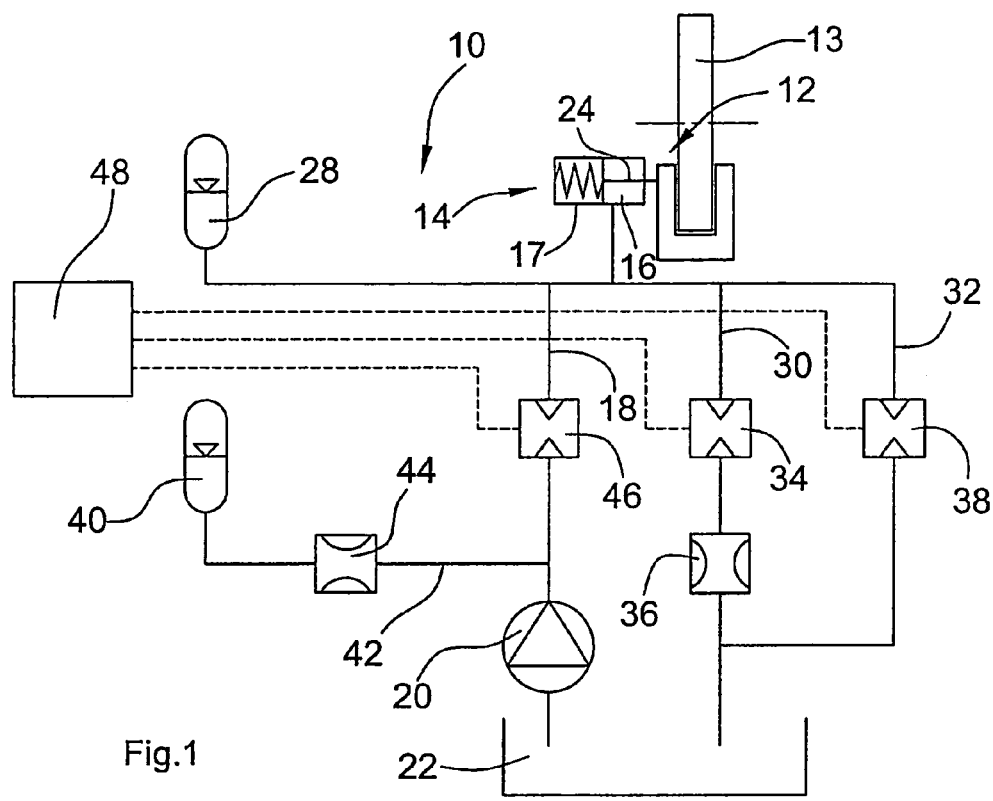
FIG. 1 shows the circuit diagram for a hydraulic brake system comprising a passive (fail-safe) brake.
Figure 2:
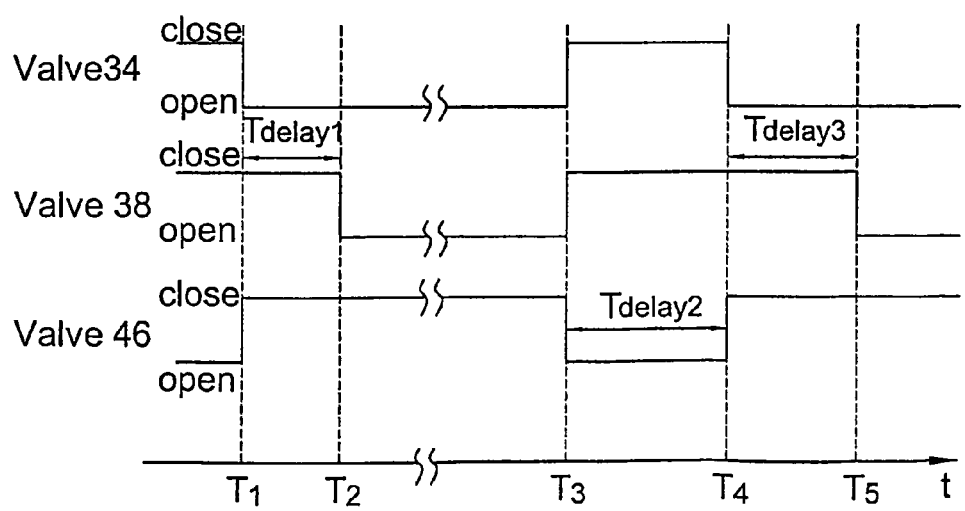
FIG. 2 shows a schematic representation of the time sequence for driving the valves of the system shown in FIG. 1.

FIGS. 1 and 2 relate to a first embodiment of a hydraulic brake system 10. System 10 comprises a passive brake 12 for a—in this case, rotating—component 13 (e.g. brake disk on the rotor shaft of a wind energy plant) with one or a plurality of piston/cylinder units 14. The working volumes 16 of the cylinders 17 of the piston/cylinder unit 14 are supplied with pressurized working fluid from a reservoir 22 via a supply line 18 by means of a pump 20. The piston 24 of each piston/cylinder unit 14 is biased, e.g. by means of a spring 26, into the braking position actuating the brake 12, and can be moved against the biasing force into a release position by pumping working fluid into the working volume. Connected to the working volume 16 is a first storage means 28 storing such a quantity of pressurized working fluid that the overall volume of the brake piston and the storage means will always be sufficient to close the brake 12.

Connected to the working volume 16 of each piston/cylinder unit 14 are a discharge line 30 and a bypass line 32 connected in parallel thereto, which lines lead back to the reservoir 22. The discharge line 30 has an ON/OFF valve 34 and a constriction 36 arranged therein, and the bypass line 32 has an ON/OFF valve 38 arranged therein.

Arranged to enter the supply line 18 is a further (supply) line 42 connected to a further storage means 40 and provided with a further constriction 44. This line 42 is connected to the supply line between the pump 20 and a further ON/OFF valve 46 arranged behind the pump 20 in the flow direction of the working fluid. To carry out a braking process, all valves 34, 38 and 46 are controlled by a drive unit 48 in the sequence represented in FIG. 2.

Prior to a braking process, valves 34 and 38 are closed and valve 46 is open. Pump 20 supplies pressurized working fluid to the two storage means 28 and 40 and to each piston/cylinder unit 14 of the passive brake 12.

At the beginning $T_1$ of a braking process, valve 34 is opened so that working fluid can flow off from each piston/cylinder unit 14. The flow-off rate is determined by the constriction 36 and is selected such that the brake 12 does not act too promptly onto the component 13 to be braked. In this manner, excessive vibrations and excessive load peaks of the system to be braked (not shown) are avoided.

Displaced in time relative to the beginning $T_1$ of the brake process by the delay period $T_{delay1}$, the valve 38 of the bypass line 32 positively opened by the drive unit 48 at the point of time $T_2$ ($T_2=T_1+T_{delay1}$). Thereby, it is safeguarded that at the latest after the lapse of the time period $T_{delay1}$, working fluid possibly still contained in the piston/cylinder units 14 which prevents a complete effectiveness of the brake, can flow off. This can be the case e.g. when the discharge line is at least partially clogged.

Towards the end of the braking process, valve 46 is opened at a time $T_3$ while valves 34 and 38 are closed. Now, working fluid is moved out of the storage means 40 with a flow rate determined by constriction 44 into the volumes 16 of the piston/cylinder unit 14 of the passive brake 12, whereby the latter is released again. At the time $T_3$, the component 13 to be braked still has a residual rotational speed, i.e. is not yet at a standstill. By the release of brake 12 at this point of time, a generation of stoppage vibrations is prevented.

The size of storage means 40 has to be selected such that a sufficient quantity of pressurized working fluid will be available so that the working volumes 16 of piston/cylinder unit 14 can be filled for releasing the brake and, in the given case, the storage means 28 can be "bridged".

After the brake has thus been released, it should suitably be actuated again for final arrest of component 13 (locking brake function). For this purpose, valve 46 is closed and valve 34 is opened at a point of time $T_4$ provided by a period of time $T_{delay2}$ after point of time $T_3$. Now, working fluid flows off from the volumes 16 of piston/cylinder unit 14 with a flow-off rate determined by the constriction 36. Upon lapse of a time period $T_{delay3}$ subsequent to the point of time $T_4$, valve 38 is opened at the point of time $T_5$ ($T_5=T_4+T_{delay3}$) whereby the final activation of brake 12 for fixing the component 13 is guaranteed even if, during the time period $T_{delay3}$, not all of the working fluid should have been flown off yet from the working volumes 16 of piston/cylinder unit 14 via discharge line 30.

The individual time periods $T_{delay1}$, $T_{delay2}$ and $T_{delay3}$ can be identical or different from each other and should be selected corresponding to the system conditions and under performance aspects.

FIGS. 3 and 4 illustrate an embodiment of a hydraulic brake system 60 with an active brake 62 for braking a component 63 arranged e.g. as a brake disk of a rotor shaft of a wind energy plant. Brake 62 comprises at least one the at least one piston/cylinder unit 64 with a cylinder 66, a working volume 68 and a piston 70. Connected to the working volume 68 is a supply line 72 having a pump 74 for a working fluid arranged therein. Pump 74 is arranged for the pressurized pumping of working fluid from a reservoir 76 into the working volume 68 of the piston/cylinder unit(s) 64 when the brake is to be actuated. Connected to the supply line 72 is a storage means 78 which is supplied with pressurized working fluid by pump 74. In case of malfunction of pump 74, it is still possible to actuate the brake 62 via the storage means 78.

In the supply line 72, an ON/OFF valve 80 and a constriction 82 are arranged. Thus, when the brake 62 is actuated, the supply line 72 can be opened and working fluid can flow into the working volume 68 of each piston/cylinder unit 64 at a rate determined by constriction 82.

Arranged in parallel to supply line 72 is a bypass line 84 connected to each piston/cylinder unit 64 and provided with an ON/OFF valve 86. At a site downstream of pump 74 with respect to the flow direction of the working fluid, this bypass line 84 is connected to supply line 72. The bypass line 84 has a discharge line 88 branching off it, with an ON/OFF valve 90 and a constriction 92 arranged therein.

Using the above described system 60, a braking profile is obtained wherein vibrations and excessive loads in the drive line of the system to be braked can be suppressed both at the beginning and at the end of the braking process; the sequence of the valves 80, 86 and 90 driven by a drive unit 94 is shown in FIG. 4.

In the normal case, i.e. when the brake is not actuated, all of the above three valves 80, 86 and 90 are closed. The storage means 78 is provided with pressurized working fluid.

At the beginning $T_1$ of a braking process, valve 80 is opened so that working fluid will be introduced into the working volume 68 from the storage means 78 in case of a failure of pump 74 and from the reservoir 76 in case of an intact condition of pump 74; the flow rate is determined by the constriction 82 in a manner avoiding an all to sudden actuation of brake 62. After a predetermined time period $T_{delay}$ from the time $T_1$ valve 86 is positively opened (time $T_2$), thus safeguarding that the volume 68 of each piston/cylinder unit 64 will now in any case be supplied with working fluid to effect the maximum possible actuation of brake 62, in as far as this has not been carried out before via supply line 72 due to disturbances.

Setting the flow rate in supply line 72 through the constriction 82 allows for a "soft" initiating of the brake process, precluding the generation of vibrations and excessive load peaks in the braked system. The bypass line 84 opened after a time delay is relevant under safety aspects and should in the normal case have no influence anymore on the actuation of the brake.

To avoid or reduce stoppage vibrations, it is provided that, at a time $T_3$ when the rotational speed of the to-be-braked component 63 has already decreased to a predetermined value, the valve 90 of the discharge line is opened so that working fluid can escape from the piston/cylinder unit 68 via the supply line 72 and/or the bypass line 84 (with both or at least one of the valves 80 and 86 being open) into the discharge line 88 and from there into the reservoir 76. Thus, the brake 62 is released. This process can be terminated after a short span of time so that the brake 62 will again resume its full frictional engagement with the to-be-braked component 63 to arrest the same (in a condition of standstill). The refilling of the piston/cylinder units 64 can be performed first via the supply line 72 (with valve 80 opened and valve 86 still closed) and thereafter also via the bypass line (with valve 86 opened at this time). This allows for a smooth and in any case safeguarded (renewed) actuation of brake 62 so that the brake will then act as a locking brake.

The invention claimed is:

1. A hydraulic brake system for braking a moving component in a wind energy plant, comprising at least one piston/cylinder unit for activating and releasing a brake, the piston being biased into a braking position for activating the brake and the cylinder comprising a volume adapted to have a pressurized working fluid supplied thereto for moving the piston from the braking position into a release position for releasing the brake, a first supply line connected to the volume of the at least one piston/cylinder unit for the supply of working fluid from a reservoir, a pump arranged in the first supply line, a discharge line for the discharge of working fluid from the volume of the at least one piston/cylinder unit, a first valve and an element arranged in the discharge line for determining the flow resistance, a bypass line provided with a second valve and arranged for a flow in parallel to the discharge line, and a third valve for the selective interruption or maintenance of a fluid connection between the pump and the volume of the at least one piston/cylinder unit, and a drive unit for the first, second, and third valves wherein, at the start of a braking process, the drive unit closes the third valve and among the first and second valves in the discharge line and the bypass line, which in the released condition of the brake are in the closed condition, opens the first valve and, upon lapse of a presettable first time period from the opening of the first valve, opens the second valve.

2. The hydraulic brake system according to claim 1, comprising a second supply line connected to the volume of the at least one piston/cylinder unit, and a storage means for pressurized working fluid, connected to the second supply line, the third valve between the pump and the volume of the at least one piston/cylinder unit is arranged in the second supply line, the drive unit at the start of a braking process closing the third valve which in the released condition of the brake is in the opened condition, and at the end of a braking process, the drive unit closes the first and second valves and opens the third valve for supplying pressurized working fluid from the storage means into the volume of the at least one piston/cylinder unit.

3. The hydraulic brake system according to claim 2, wherein the first supply line is arranged to enter the second supply line between the storage means and the third valve.

4. The hydraulic brake system according to claim 3, wherein the drive unit at the end of the braking process upon lapse of a presettable second time period from the opening of the third valve, closes the same and opens the first valve.

5. The hydraulic brake system according to claim 4, wherein the drive unit upon lapse of a third time period from the closing of the first valve opens the second valve.

6. The hydraulic brake system according to any one of claims 2 to 5, wherein the second supply line has arranged therein a constriction increasing the flow resistance.

7. The hydraulic brake system according to any one of claims 1 to 5, wherein each of the element and the constriction for determining the flow resistance is provided as a cross-sectional constriction in a valve or in a line or as a flow deflector.

* * * * *